UNITED STATES PATENT OFFICE.

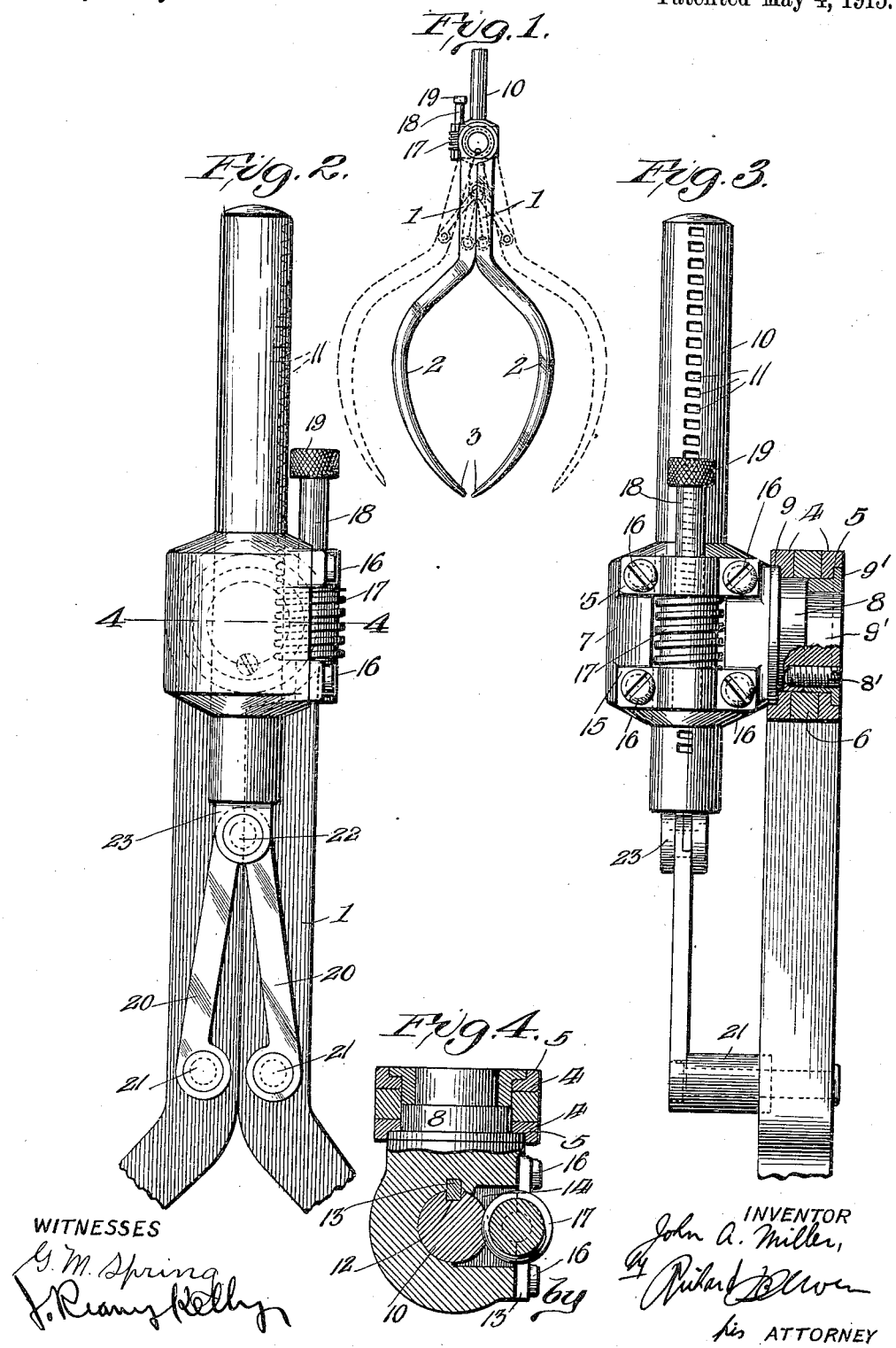

JOHN A. MILLER, OF EAST ST. LOUIS, ILLINOIS.

CALIPERS.

1,137,885.

Specification of Letters Patent.

Patented May 4, 1915.

Application filed June 14, 1912. Serial No. 703,626.

*To all whom it may concern:*

Be it known that I, JOHN A. MILLER, a citizen of the United States, residing at East St. Louis, in the county of St. Clair and State of Illinois, have invented new and useful Improvements in Calipers, of which the following is a specification.

This invention relates to the class of calipers and more specifically to that class of calipers wherein is provided certain facilities for obtaining the proper adjustment of the points.

An object of this invention is to provide a device of the above mentioned character which comprises caliper legs pivotally connected together. The said caliper legs having connected thereto, intermediate of their ends, arms which have connection with a reciprocating bar, the said bar being operated through the medium of a worm gear. By providing this arrangement of parts it is readily obvious that the adjustment of the caliper legs is greatly facilitated.

With the above and other objects in view my invention consists in such details of construction and in the arrangement and combination of parts as will be hereinafter more fully described and specifically pointed out in the appended claims.

In describing my invention in detail reference will be had to the accompanying drawings wherein like characters denote like or corresponding parts throughout the several views, and in which:—

Figure 1 is a front elevation of my invention. Fig. 2 is a fragmentary view. Fig. 3 is a side elevation showing parts broken away. Fig. 4 is a cross sectional view taken upon line 4, 4, Fig. 2.

In the accompanying drawings wherein is illustrated the preferred form of my invention, the numeral 1 designates the body portion of the divider legs which legs are flared intermediate of their ends as shown at 2 and bent inwardly at their lower extremities as shown at 3.

A drum 7 is provided which has formed upon one side thereof an extension 8, the said extension being provided with a spaced annular flange 9, the said flange engages the bifurcated end 4 of the caliper leg as is clearly shown in Fig. 2 of the drawings. The extension 8 is reduced as at 6 after passing half way through the opening in the caliper legs 2 and an annular member 9' is inserted into the openings in the caliper legs 2 and engages the reduced portion of the extension 8. The member 9' is securely held in place by means of a set screw 8' which extends therethrough and enters a screw threaded aperture in the extension 8. The drum has operating therethrough an elongated bar 10 which is provided with a plurality of recesses 11 and with a vertically extending groove 12 for the purpose hereinafter set forth. A key 13 which is carried within the drum operates within the groove 12 in such a manner as to prevent the rotation of the bar. A cut-out portion 14 is provided in one side of the drum which cut-out portion is spanned by the brackets 15 which brackets are held in place by means of the set screws 16 and supporting a worm gear 17, the teeth upon the worm gear meshing with the recesses 11 of the bar. For the purpose of facilitating operation of the worm gear an extension 18 is provided thereon which extension carries a thumb wheel 19. It is readily obvious that when the worm gear is revolved movement will be imparted to the bar 10 which will cause the same to move in opposite directions. Means are provided for connecting the bar to the caliper legs which means comprises arms 20 pivotally connected to the legs as shown at 21 and which have pivotal connection as shown at 22 to the bifurcated end 23 of the bar. It will be appreciated that accurate and fine adjustment of the legs can be obtained through the manipulation of the worm gear.

I desire it to be understood that I may make slight changes in the construction and in the arrangement and combination of parts provided such changes fall within the scope of the subjoined claims.

Having thus described my invention what I claim as new and desire to secure by Letters Patent is:—

1. In a device of the character described, the combination of caliper legs pivotally connected at their upper ends, a drum carried by said upper ends, a bar slidably mounted in said drum, said bar provided with a plurality of cut-out portions serially arranged, a worm gear meshing with said cut-out portions, means for operating said worm gear, and means connecting said slidable bar and said caliper legs whereby the said legs may be adjusted.

2. In a device of the character described, a drum having an extension formed thereon, said extension being provided with an annular flange, caliper legs pivotally mounted upon said extension, said flange forming an abutment for one of said caliper legs and aiding in preventing lateral movement of the same upon said extension, a bar operating through said drum, a worm gear for operating said bar, the lower end of said bar being bifurcated and means connecting said bifurcated end and said caliper legs whereby when said worm gear is operated said legs will be adjusted in the manner described.

3. In a device of the character described, a drum having an extension formed thereon, an annular flange formed upon said extension, caliper legs pivotally mounted upon said extension, said flange forming an abutment for one of said caliper legs and aiding in preventing lateral movement of the same upon said extension, a bar operating through said drum, a worm gear carried by said drum for operating said bar, the lower end of said bar being bifurcated and arms pivotally connected to each of said divider legs and to the bifurcated end of said bar whereby when said worm gear in operated said divider legs will be operated in the manner described.

4. In a device of the character described, a drum having an extension formed thereon, said extension being provided with an annular flange, caliper legs pivotally mounted upon said extension, said flange forming an abutment for one of said caliper legs and aiding in preventing lateral movement of the same upon said extension, a bar operating through said drum, said bar provided with a longitudinally extending groove, a key carried by said drum in engagement with said groove whereby the rotation of said bar is prevented, a worm gear for operating said bar, the lower end of said bar being bifurcated and arms pivotally connected to each of said legs and to said bifurcated end of the bar for the purpose described.

5. In a device of the character described, a drum having an extension formed thereon, said extension being provided with an annular flange, caliper legs pivotally mounted upon the said extension, said drum having a bar operating therethrough, said bar provided with a plurality of recesses, said drum provided with a cut-out portion, brackets spanning said cut-out portion and supporting a worm gear, an extension formed upon said worm gear thereby facilitating its operation, said worm gear meshing with the recesses in said bar, the lower end of said bar being bifurcated and arms pivotally connected to each of said legs and to the bifurcated end of said bar whereby when said worm gear is operated said legs will be adjusted in the manner described.

6. In a pair of calipers, the combination of pivotally connected caliper legs, a drum to which the legs are pivoted, a bar slidably mounted in said drum, means for slidably operating said bar, and means to move the legs through adjustment of the bar.

JOHN A. MILLER.

Witnesses:
N. L. LONGLEY,
RICHARD BLUVEN.

Copies of this patent may be obtained for five cents each, by addressing the "Commissioner of Patents, Washington, D. C."